SVATOPLUK MACKRLE
VLADIMIR MACKRLE
OLDRICH DRACKA
INVENTORS

By: Michael S. Striker
Attorney

United States Patent Office 3,524,810
Patented Aug. 18, 1970

3,524,810
METHOD AND ARRANGEMENT FOR CHEMICAL CLARIFYING OF LIQUIDS
Svatopluk Mackrle, Brno, Vladimir Mackrle, Prague, and Oldrich Dracka, Brno, Czechoslovakia, assignors to Rudne A. Nerudne Doly, narodni podnik, Ejpovice, Czechoslovakia
Filed July 1, 1968, Ser. No. 741,711
Claims priority, application Czechoslovakia, June 30, 1967, 4,828
Int. Cl. B01d *21/08*
U.S. Cl. 210—20          16 Claims

ABSTRACT OF THE DISCLOSURE

A method of clarifying liquids, especially water, in which the liquid and coagulation agents mixed thereto are fed under pressure in an enclosed space to form in the latter, by reaction of the agents with the impurities of the liquid, flakes suspended in the liquid, in which the flakes are broken up by mechanical action to substantially uniform size close to the size of colloidal particles, in which from the thus obtained homogenized suspension fluidized sludge blanket is formed through which additional homogenized suspension is fed in upward direction and the liquid from the space above the sludge blanket is passed under pressure through a multilayer filter bed from which the clarified liquid is discharged; and an apparatus for carrying out the method.

BACKGROUND OF THE INVENTION

The present invention relates to a method and apparatus for chemically clarifying liquids, particularly water by means of coagulation agents.

Coagulation by means of hydrolizing coagulation agents is generally used in precipitation processes for chemical water treatment. The suspension created by coagulation may also be separated in solids and clarified liquid by a separation process using a sludge blanket and filtration. The quality of the treated water will depend on the efficiency of coagulation and subsequent separation. With known methods and apparatus for chemical water treatment the created precipitate and the bacteriological water pollutants are, however, not perfectly removed. This results in the presence of coagulation agents in the treated water in an amount substantially larger than would correspond to the solubility of products of hydrolysis of the coagulant as well as to the presence of bacteria in the treated water. An excessive amount of coagulants remaining in the treated water renders the latter unsuitable for certain industrial purposes, especially since the presence of coagulating agents is one of the main causes of corrosion of pipe lines. The presence of bacteria in the treated water obtained with known clarifying processes require always a subsequent disinfection of the water by subsequent treatment.

Various processes and apparatus are known for purifying liquid, especially water, by adding coagulation agent thereto. The coagulation agent is usually added in large amount to the water to be treated so as to create a strong supersaturation, whereby the coagulation process proceeds quickly and in a non uniform manner, with the result that the particles of the flocculated suspension differ substantially in size as well as in shape and compactness from each other. In one known process the thus-created flakes are separated from the liquid by a sedimentation process carried out in an open vessel in which the liquid is discharged from the top of the vessel and the sediments from the bottom thereof. The liquid is subsequently subjected to a disinfection process for removing bacteria.

In another known process the liquid with the flakes suspended therein is guided through a fluidized sludge blanket and subsequently through a filtering bed. However, this latter process also does not lead to perfect removal of coagulation agents from the liquid and requires also further chemical treatment of the water to remove bacteria therefrom. The penetration of coagulation agents and bacteria into the treated water in known water-treatment processes is caused mainly by the inhomogeneity of the particles of the flocculated suspension created by coagulation or by an insufficient filtration of the material.

It is an object of the present invention to provide for a method and apparatus for treating liquid, especially water, which is improved over similar processes known in the art.

It is a further object of the present invention to provide for an apparatus for clarifying liquids, especially water, which is composed of relatively few and simple parts so that it may be manufactured at a reasonable cost and stand up properly under extended use.

SUMMARY OF THE INVENTION

With these objects in view, the method according to the present invention of clarifying liquids, especially water, mainly comprises the steps of feeding the liquid and coagulation agents under pressure in an enclosed space to form in the latter, by reaction of the coagulation agents with the impurities of the liquid, a suspension of flakes in the liquid, disintegrating the flakes by mechanical action in the space to a size close to the size of colloidal particles to thus form a homogenized suspension, forming from the homogenized suspension a fluidized sludge blanket, feeding additional homogenized suspension at such a speed upwardly through the sludge blanket to maintain the latter in perfectly fluidized condition, and feeding the liquid from the space above the sludge blanket under pressure through a multilayer filter bed.

The apparatus according to the present invention for chemically clarifying the liquids, especially water, by coagulation agents mainly comprises a pressure vessel, wall means forming in the pressure vessel a central homogenizing space extending substantially through the whole height of the vessel, inlet means communicating with the homogenizing space for feeding a liquid to be treated and a coagulation agent thereinto to form in the homogenizing space a suspension of flakes in the liquid formed by the reaction of the coagulation agent with the impurities of the liquid, stirring means in the homogenizing space for stirring the suspension therein to form a homogenized suspension in which the flakes are reduced to a size close to the size of colloidal particles, a separation space in the pressure vessels surrounding the homogenizing space and communicating with the bottom portion of the latter by narrow gap means through which the homogenized suspension passes to form in the separation space a fluidized sludge blanket, a collecting space formed in the pressure vessel above the separation space for collecting liquid which has been partly clarified by passing through the sludge blanket, a sedimentation space surrounding the separation space and communicating with the latter at the junction of the separation space and the collecting space, a filtering space including a multilayer filter bed in the pressure vessel and communicating with top portions of the collecting space and the sedimentation space, first outlet means communicating with the filtering space for discharging filtered liquid therefrom, and second outlet means communicating with a bottom portion of the sedimentation space for discharging sediments thereform.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
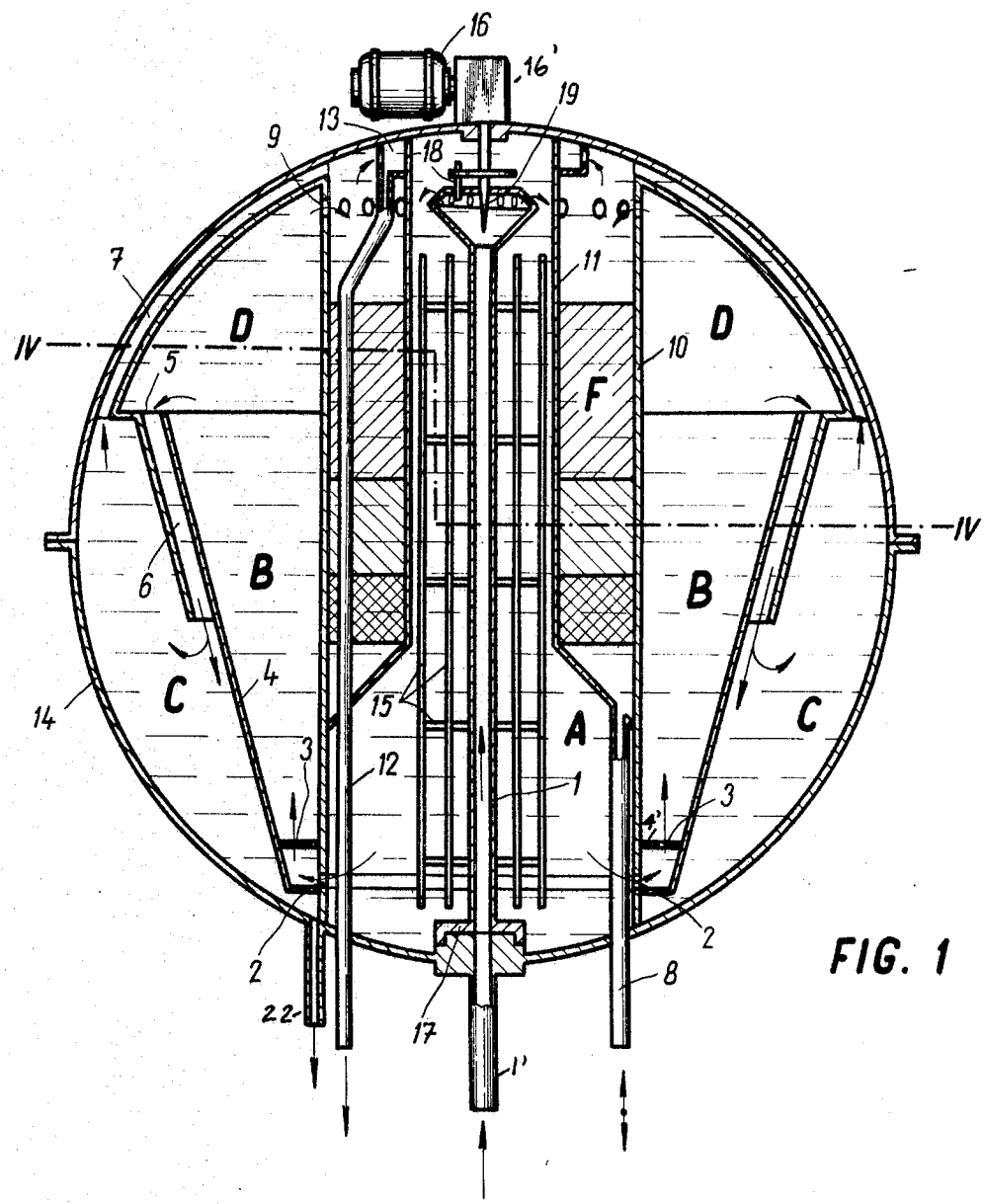
FIG. 1 is an axial cross section through one embodiment of an apparatus according to the present invention.

Referring now to the drawings, and more specifically to FIG. 1 of the same, it will be seen that the apparatus according to the present invention for clarifying liquids, especially water, mainly comprises a pressure vessel formed by a pair of substantially semi-spherical shells 14 joined at the large diameter ends to each other in any convenient manner. The interior of the pressure vessel formed by the shells 14 is divided in several treating spaces as will now be described in detail. Tubular cylindrical wall means 11 are fluid-tightly joined at the upper end thereof to a central portion of the upper shell 14, whereas the lower flaring end of the tubular wall means 11 is joined in a fluid-tight manner to another tubular wall 10 coaxially arranged and surrounding the wall means 10 and fluid-tightly joined at the upper and lower ends to the upper and lower shells 14. The tubular wall means 11 form with the lower portion of the tubular wall 10 a central homogenizing space A in the pressure vessel formed by the shells 14, whereas the walls 10 and 11 form between themselves a filtering space F surrounding the upper portion of the homogenizing space A.

Stirring means are coaxially arranged in the homogenizing space A. These stirring means comprise an elongated hollow shaft 1 coaxially arranged in the space A and extending substantially through the whole height thereof and ending at its upper part in an enlarged funnel-shaped portion communicating through a plurality of openings with the space A. The lower end of the hollow shaft 1 is turnably mounted on a thrust bearing 17 formed in a central portion of the lower shell 14. The stirring means comprise further a plurality of elongated, substantially rod shaped elements 15 extending substantially parallel to and spaced from the hollow shaft 1 uniformly distributed about the axis of the latter and connected thereto by cross rods for rotation therewith. The stirring means formed by the hollow shaft 1 and the rods 15 connected thereto are driven, in the embodiment shown in FIG. 1, by mechanical drive means including an electric motor 16 mounted outside the pressure vessel and having a drive shaft, a step-down transmission 16', including a vertical driven shaft 19 extending through an opening in the top wall of the enlarged upper portion of the hollow shaft 1, and an eccentric pin 18 connected to the shaft 19 for rotation therewith and extending through a lateral opening in the top wall of the enlarged upper portion of the hollow shaft 1 to rotatae the latter about its axis during energizing of the drive motor 16.

A substantially frustoconical wall 4 surrounds the lower portion of the wall 10 and forms with the latter an upwardly widening separation space B. A substantially horizontal wall 4' extends transversely through a lower portion of the separation space B and the space below the wall 4' communicates through an annular gap 2 with the interior of the homogenizing space A, whereas an annular gap 3 of a width of a few millimeters formed in the transverse wall 4' provides communication with the space below the transverse wall and the space above the latter.

The separation space B is open at its upper end and a portion of the upper shell 14 forms with a ortion of the cylindrical wall 10 a collecting space D above the separation space. The collecting space D communicates in the region of its upper end by a plurality of openings or ports 9 with an upper portion of the filtering space F. The frustoconical wall 4 forms together with corresponding portions of the shells 14 a sedimnetation space C which communicates at the junction of the spaces B and D by an annular passage 6 formed by a baffle plate surrounding an upper portion of the frustoconical wall 4, spaced therefrom. The space C communicates at its upper end with an upper end of the filtering space F through a plurality of curved passages or conduits 7.

An annular collecting space 13 is formed in an upper portion of the filtering space F communicating with the latter through a plurality of ports and a conduit 12 leads from the annular collecting space 13 downwardly through the filtering space F and through a lower portion of the space A to the outside of the pressure vessel. A multilayer filter means fills an intermediate portion of the filtering space, and the grain size of the multilayer filtering means, or filtering bed, decreases in downward direction. First outlet means in the form of a discharge tube 8 communicate with the lower portion of the filtering space F and lead from the latter to the outside of the pressure vessel, whereas second outlet means in the form of a tube 22 communicate with a lower portion of the space C. Inlet means in the form of a tube 1' extend through the bearings 17 and communicate with the lower end of the tubular shaft 1.

Figures 2, 3:
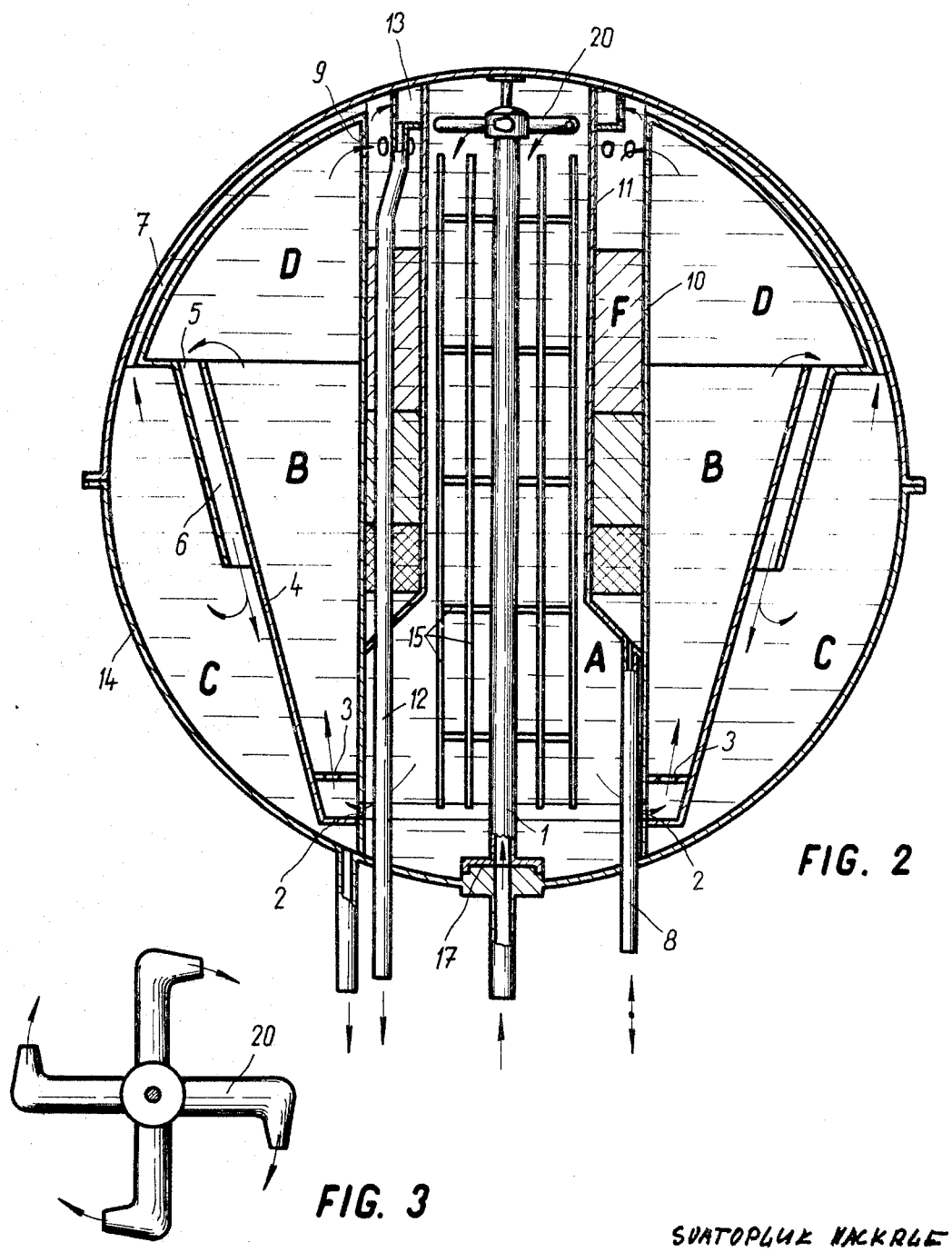
FIG. 2 is an axial cross section similar to FIG. 1 showing a second embodiment of the present invention.
FIG. 3 is a top view of a detail of the embodiment shown in FIG. 2.
Figure 4:
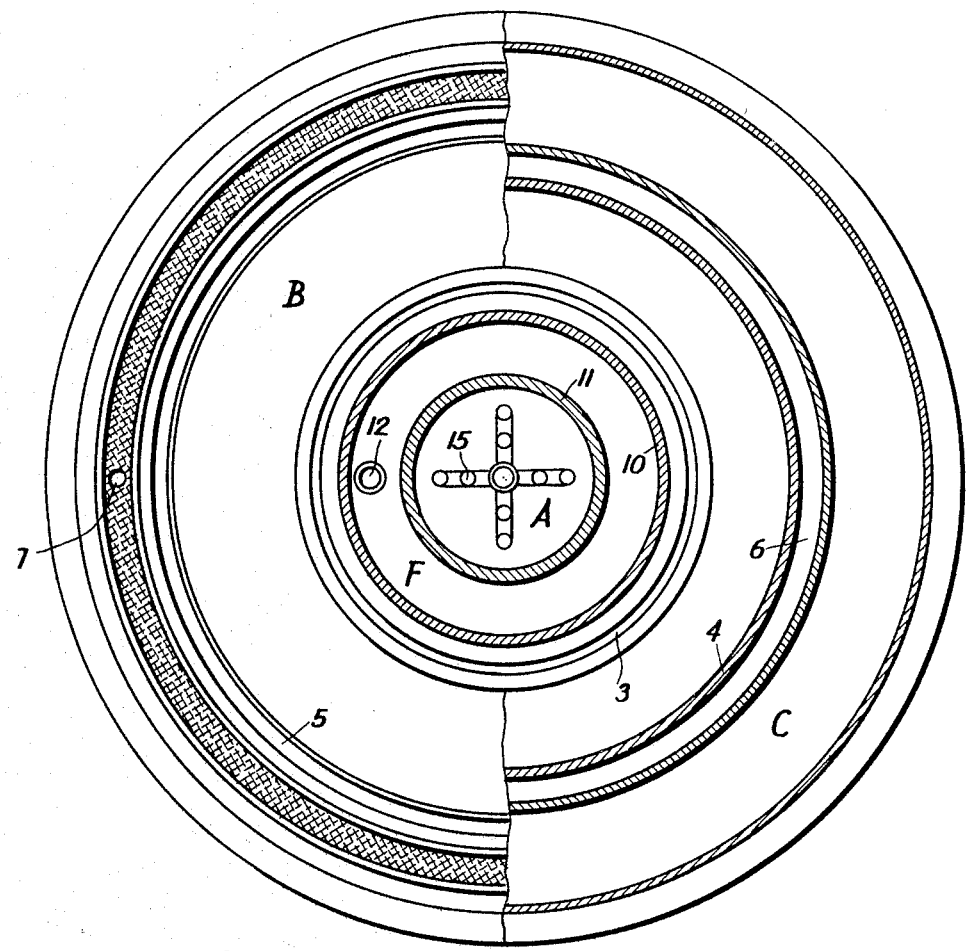
FIG. 4 is a transverse cross section taken along the line IV—IV of FIG. 1.

The embodiment shown in FIG. 2 differs from the above-described embodiment illustrated in FIG. 1 only by the drive for turning the stirring means about its axis. The elements of the embodiment shown in FIG. 2 which are identical with those of the embodiment shown in FIG. 1 are referred to in the FIG. 2 with the same reference numerals as indicated in FIG. 1 and need therefore not be described.

The drive means for turning the stirring means comprising the hollow shaft 1 and the rods 15 connected thereto are constituted in the embodiment shown in FIG. 2 by hydraulic means in the form of a Segner wheel, as best shown in FIG. 3 having four tubular arms extending normal to each other in a plane substantially normal to the axis of the hollow shaft 1 and communicating at the inner ends thereof with the interior of the latter, while the outer ends of the arms are bent substantially at right angles to the main portions thereof so that a stream of pressurized liquid fed into the hollow shaft 1 and passing through the constricted outer ends of the arms will form tangential jets emanating from the arms, as indicated by the arrows in FIG. 3, to thus drive the Segner wheel 20 and the stirring means connected thereto in a direction opposite to the direction indicated by the arrows. In this way an increased turbulence is created in the space A.

The above-described apparatus shown in FIG. 1 or 2 may be operated as follows. Liquid to be clarified, especially water with added coagulation agents in an amount of about 40 to 80 mg. per liter of hydrolized coagulant is fed at an overpressure of about 0.5 to 1 kg. per square centimeter through the inlet 1' into the hollow shaft 1 to pass through the openings in the upper end of the latter into the homogenizing space A in which the flakes formed by the reaction of the coagulation agents with the liquid, especially water, are disintegrated by the mechanical action of the stirring means 15, which are rotated either by the drive motor 16, as shown in the embodiment of FIG. 1, or by the Segner wheel 20, as shown by the embodiment of FIG. 2 which rotate the stirring means 15 with a relative high speed in the order of a few tenths of revolutions per minute and the flakes formed in the space A are subjected in the space A to a stirring action for a time of about 10 to 15 minutes so that the flakes are broken up to uniform size close to the size of colloidal particles to thus form a homogenized suspension. This homogenized suspension passes through the gaps 2 and 3 into the separation space B to form in the latter a perfectly fluidized sludge blanket through which the subsequently-formed homogenized suspension passes in upward direction which partly overflows through the annular passage 6 into the sedimentation space C while partly clarified liquid forming in the collecting space D will flow through the ports 9 into the upper portion of the filtering space F to pass through the multilayer filtering bed therein so that any particles remaining in the liquid passing in the filtering space will be filtered therefrom and the perfectly clarified liquid will flow out from the filtering space F after having passed through the multilayer filtering bed through the outlet means or the tube 8 communicating with a bottom portion of the filtering space. The particles contained in the suspension flowing from the space B into the sedimentation space C settle at the bottom portion of the latter to be discharged from the space C through the second outlet means, that is the tube 22, whereas substantially clear liquid forming at the upper end of the space C flows through the passages 7 into the upper end of the filtering space F to pass likewise through the multilayer filter bed therein.

The multilayer filter bed is composed of at least two layers, the upper layer being anthracite of a uniform grain size of about 1 mm. of diameter, the lower layer of quartz sand of uniform grain size of about 0.5 mm. The upper layer has the height of about 50 cm., the lower one about 30 cm. While using pressure, available in the apparatus and the described filter bed a utilization of about 70% of filtering capacity is reached. In addition to the high quality of filtrate a filtration period of several days is achieved without requiring washing of the filter bed.

The width of the annular gap 3 and the pressure at which liquid to be clarified and the coagulation agents are fed through the inlet means 1' into the coagulation space A are chosen in such a manner that the flakes formed in the coagulation space are subjected to a stirring action for a time of about 10 to 15 minutes, whereas the speed in which the homogenized liquid passes through the gap 3 into the space B is such so as to maintain sludge blanket formed in this space in perfect fluidized condition. The outflow of sediments from the space C through the tube 22 may be regulated by valve means provided in the tube 22 and not shown in the drawing. The flow of liquid through the filtering space F is determined by the grain size of the multilayer filter bed which, as mentioned above, decreases from one layer to the next in downward direction.

As coagulation agents for the chemical coagulation, hydrolyzing coagulants can be used, as for instance sulfates or chlorides of polyvalent metals, such as aluminum or iron and in addition thereto, neutralizing agents such as lime, soda and similar agents, and polymeric coagulants as for instance macromolecular substances causing bonds of particles formed by coagulation due to their chain structure, as for instance polyacrylates or similar compounds. Such polymeric coagulants may be added in the relative amount of 1 to 30 to the hydrolizing coagulants.

As already mentioned, the liquid is stirred in the homogenizing space for about 10 to 15 minutes and the whole clarifying process carried out in the above-described apparatus takes about 30 to 40 minutes.

The introduction of hydrolizing coagulants into the water to be treated causes due to the chemical reaction a hydrolysis of polyvalent ions of metal (Al, Fe) and a precipitate is formed from which primary agglomerates, due to mutual contact caused by Brownian movement, and due to a low zeta potential continue to agglomerate to larger particles. This constitutes the first phase of coagulation called the perikinetic coagulation. The size of the thus-created agglomerates is limited by the influence of the Brownian motion to particles of up to a certain size, the upper limit of which is the size of colloidal particles, i.e., about 1 micron. The Brownian motion is not effective any longer above this particle size. A further agglomeration can be achieved only by mutual contact of the particles due to turbulence. The size of the thus-created flakes depends on the character and intensity of the turbulence and the shear resistance of the created flakes. In known methods, turbulence created by mechanical means for orthokinetic coagulation has been used in order to obtain a flake size suitable for separation processes based on sedimentation. Due to the statistic character of the orthokinetic coagulation, flake agglomerates of non-homogeneous character as to size and compactness have been created in such a case.

For separation of the flocculated suspension in a perfectly fluidized sludge blanket where no sedimentation takes place and where the separation process is a filtering process, small, compact flakes of a size close to the size of colloidal particles, i.e. in order of tenths of microns, are best suitable. Such flake particles can be obtained by repeatedly disintegrating larger flakes created by coagulation by a high-intensity of turbulence created in the coagulation space A of the apparatus according to the present invention. Due to this homogenization action only very compact flakes of small size will remain, while less compact and larger flakes are quickly disintegrated. By carrying out this homogenizing process in the space A for a prolonged time, that is for about 10 to 15 minutes, an optimum quality of the flocculated suspension suitable for the subsequent filtration process can be obtained which increases substantially the efficiency of the process according to the present invention.

The homogenization of the suspension increases also the effect of polymeric agents added as coagulation aids to the hydrolyzing coagulation agents. The bond action of the macromolecular structure of the small added amount of polymeric coagulants is much more effective in the case of a uniform distribution of these coagulants in the structure of the formed flakes, which is achieved by repeated disintegration and compacting of the flakes due to the homogenization. This likewise increases the efficiency of the process.

The liquid with the homogenized particles enters the space B in which the perfectly fluidized sludge blanket is maintained through the slot 2 and is uniformly distributed through the annular slot 3 at a speed required for the maintenance of the sludge blanket in a perfectly fluidized condition. These particles are coagulating in the perfectly fluidized sludge blanket to larger agglomerates which are retained here, whereby part of the water with the excess suspension from the perfectly fluidized sludge blanket passes through the openings 5 and is rectified in the passage 6 while passing into the space C. The partly cleared liquid from the perfectly fluidized sludge blanket after having passed the space D enters by way of the openings 9 the filtering space F, and the settled liquid from the space C likewise enters through the conduits 7 the filtering space F. The partly cleared and the settled liquid is filtered in the filtering space F by the multilayer filter bed therein in which the grain size of the filter material of the individual layers decreases in direction of the fluid stream therethrough. The grain size of the individual layers and their height are chosen so as to achieve a maximum filtering capacity of the filter bed for the respective pressure within the apparatus and a quantitative removal of the coagulation agents and of bacteria.

The filter bed may be rinsed by feeding rinsing water in upwards direction through the tube 8 so that the rinsing water after passing through the filter bed is collected in the annular collecting space 13 and discharged through the conduit 12. When no rinsing takes place, the conduit 12 is closed by a valve, not shown in the drawing.

The mentioned overpreshure and time of stirring is used during clarifying of water and if other liquids have to be clarified the respective overpressure and stirring time and the arrangement of the filter layers have to be adjusted accordingly.

The arrangement and method according to the present invention has numerous advantages. The homogenization and compacting of the flocculated suspension in the space A and the use of a multilayer filter bed in a pressure clarifier for chemical water treatment with forced circulation provides not only a quantitative perfect removal of bacteria and an increased degree of removal of residual coagulation agents, but also quantitatively an increased output.

The increased efficiency in removal of coagulation agents is especially important when the clarified water has to be used for special industrial purposes which require a very small content of residual coagulation agents in the treated water, for instance if the treated water is used during the manufacture of artificial threads or if the treated water is distributed through a distributing system in which the presence of residual coagulation agents would produce an increased corrosion. The increased efficiency of the method and apparatus according to the present invention produces also a substantially bacteria-free water which has not to be further treated by separate disinfecting means. Another advantage produced by the stirring in the homogenizing space is that clogging of the narrow gap between this space and the space B is positively prevented.

It will be understood that each of the elements described above, or two or more together, may also find a useful application in other types of methods and apparatus for clarifying liquids, differing from the types described above.

While the invention has been illustrated and described as embodied in a method and an apparatus for clarifying liquids, especially water, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A method of clarifying liquid, especially water, comprising the steps of feeding the liquid and coagulation agents under pressure in an enclosed space to form in the latter a suspension of flakes in the liquid formed by reaction of the coagulation agents with the impurities of the liquid; repeatedly disintegrating the flakes by mechanical action in said space to a size close to the size of colloidal particles to thus obtain a homogenized suspension containing substantially only solid particles having a size close to the size of colloidal particles; forming from the thus homogenized suspension a fluidized sludge blanket; feeding additional homogenized suspension in a stream at such a speed upwardly through the sludge blanket to maintain the latter in perfectly fluidized condition and to prevent any solid particles to settle below the sludge blanket, while filtering the additional homogenized suspension during its passage through the fluidized sludge blanket; feeding the thus filtered liquid from a space above the sludge blanket under the pressure maintained in said closed space through a multi-layer filter bed to thus subject the liquid to a second filtering action, while permitting flakes in said upwardly directed stream to settle laterally of said stream and said fluidized sludge blanket; and discharging said flakes from said enclosed space after settling.

2. A method as defined in claim 1, wherein said coagulation agents comprise hydrolyzing agents.

3. A method as defined in claim 2, wherein said hydrolyzing agents comprise sulfates or chlorides of polyvalent metals.

4. A method as defined in claim 3, wherein said polyvalent metals are selected from the group consisting of iron and aluminum.

5. A method as defined in claim 2, wherein into said coagulation agents polymeric agents are added.

6. A method as defined in claim 5, wherein said polymeric agents comprise polyacrylates.

7. A method as defined in claim 5, wherein said polymeric agents are mixed in relation of 1:30 to said hydrolyzing agents.

8. Apparatus for chemically clarifying liquid, especially water, by coagulation agents, said apparatus comprising, in combination, a pressure vessel; wall means forming in said pressure vessel a central homogenizing space extending substantially through the whole height of said vessel; inlet means communicating with said homogenizing space for feeding under pressure a liquid to be treated and a coagulation agent thereinto to form in said homogenizing space by reaction of the coagulation agent with the impurities of the liquid a suspension of flakes in the liquid; stirring means in said homogenizing space for stirring the suspension therein to form a homogenizing suspension in which the flakes are reduced to size close to size of colloidal particles; a separation space in said pressure vessel surrounding said homogenizing space and in communication with a bottom portion of the latter by marrow gap means through which said homogenized suspension passes to form in said separation space a fluidized sludge blanket; a collecting space formed in said pressure vessel above said separation space for collecting liquid which has been partly clarified by passing through the sludge blanket; a sedimentation space surrounding said separation space and communicating with the latter at the junction of said separation space and said collecting space; a filtering space including a multilayer filter bed in said pressure vessel and communicating with top portions of said collecting space and said sedimentation space; first outlet means communicating with said filtering space downstream of said filter bed for discharging filtered liquid therefrom, and second outlet means communicating with a bottom portion of said sedimentation space for discharging sediments therefrom.

9. An apparatus as defined in claim 8, wherein said pressure vessel is composed of shell parts formed by bodies of revolution.

10. An apparatus as defined in claim 8, wherein said pressure vessel is composed of a pair of semi-spherical shells.

11. An apparatus as defined in claim 8, wherein said filtering space surrounds said homogenizing space and has an annular cross-section.

12. An apparatus as defined in claim 8, wheren said stirring means comprises a hollow shaft extending coaxially through said homogenizing space and communicating at its upper end with the latter and a plurality of elongated members connected to said shaft substantially parallel thereto and substantially uniformly distributed about the shaft axis, bearing means supporting said shaft at the lower end thereof, and drive means connected to said shaft for rotating the latter about its axis, said inlet means communicating with the lower end of said hollow shaft.

13. An apparatus as defined in claim 12, wherein said drive means comprise motor means located outside said pressure vessel and step-down transmission means connecting said motor means to said shaft.

14. An apparatus as defined in claim 12, wherein said drive means comprise hydraulically operated means connected to said upper end of said hollow shaft and communicating therewith to rotate said shaft by jet action.

15. An apparatus as defined in claim 8, wherein said separation space surrounding said homogenizing space is of substantially frustoconical configuration upwardly increasing in diameter, and including a wall extending transversely through a lower portion of said separating space, said gap means comprising a first annular gap through said wall means forming said homogenizing space, said first annular gap being located below said transverse wall in said separating space, and a second narrow annular gap in said transverse wall.

16. An apparatus as defined in claim 15, wherein said second annular gap has a width of a few millimeters so that the homogenized suspension passes at elevated speed through said second annular gap, which speed decreases considerably as the suspension passes upwardly in said frustoconical separation space.

References Cited

UNITED STATES PATENTS

| 2,179,246 | 11/1939 | Applebaum | 210—208 |
| 2,411,386 | 11/1946 | Parker et al. | 210—207 X |
| 2,860,786 | 11/1958 | Kittredge | 210—207 X |
| 2,948,400 | 8/1960 | Hagen | 210—256 |
| 2,969,149 | 1/1961 | Mackrle et al. | 210—195 |
| 3,130,167 | 4/1964 | Green | 210—52 X |

MICHAEL E. ROGERS, Primary Examiner

U.S. Cl. X.R.

210—49, 208, 265